(12) United States Patent
Kamiyama et al.

(10) Patent No.: US 10,817,164 B2
(45) Date of Patent: Oct. 27, 2020

(54) MOVING A DRAG OBJECT ON A SCREEN

(71) Applicant: INTERNATIONAL BUSINESS MACHINES CORPORATION, Armonk, NY (US)

(72) Inventors: Yoshiroh Kamiyama, Tokyo (JP); Gou Nakashima, Edogawaku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/553,185

(22) Filed: Aug. 28, 2019

(65) Prior Publication Data
US 2019/0384473 A1 Dec. 19, 2019

Related U.S. Application Data

(63) Continuation of application No. 15/430,907, filed on Feb. 13, 2017, now Pat. No. 10,409,475, which is a
(Continued)

(30) Foreign Application Priority Data

Nov. 20, 2008 (JP) .................................. 2008-296834

(51) Int. Cl.
*G06F 3/0486* (2013.01)
*G06F 3/0481* (2013.01)
(52) U.S. Cl.
CPC ........ *G06F 3/0486* (2013.01); *G06F 3/04812* (2013.01)
(58) Field of Classification Search
CPC .................................................... G06F 3/0486
(Continued)

(56) References Cited

U.S. PATENT DOCUMENTS 5,704,028 A 12/1997 Schanel
5,754,179 A 5/1998 Hocker
(Continued)

FOREIGN PATENT DOCUMENTS

CA 2739514 A1 5/2010
CN 101010657 A 8/2007
(Continued)

OTHER PUBLICATIONS

WIPO Appln. No. PCT/JP2009/069246 Written Opinion, dated May 20, 2011, 4 pg.
(Continued)

*Primary Examiner* — William D Titcomb
(74) *Attorney, Agent, or Firm* — Cuenot, Forsythe & Kim, LLC

(57) ABSTRACT

Problem To improve operability.
Solving Means There is provided a display apparatus for moving a drag object on a screen in accordance with an operation of a pointer performed by a user. The display apparatus includes: a detection unit for detecting a target object on the screen, the target object being a destination of the drag object; and a display control unit for displaying the drag object in a position closer to the target object than a display position of the pointer moved in accordance with an operation performed by a user. As a distance between the pointer and the target object becomes shorter, the display control unit makes larger an offset amount by which the drag object is offset from the pointer in a direction close to the target object, and as an association degree representing strength of an association between the drag object and the target object becomes higher, the display control snit makes the offset amount larger.

17 Claims, 9 Drawing Sheets

Related U.S. Application Data continuation of application No. 13/567,477, filed on Aug. 6, 2012, now Pat. No. 9,582,176, which is a continuation of application No. 13/130,356, filed as application No. PCT/JP2009/069246 on Nov. 12, 2009, now Pat. No. 9,582,174.

(58) Field of Classification Search
USPC .......................................................... 715/769
See application file for complete search history.

(56) References Cited

U.S. PATENT DOCUMENTS

| | | |
|---|---|---|
| 5,808,601 A | 9/1998 | Leah |
| 5,917,486 A | 6/1999 | Rylander |
| 5,986,639 A | 11/1999 | Ozawa |
| 5,990,862 A | 11/1999 | Lewis |
| 6,075,531 A | 6/2000 | Destefano |
| 6,239,803 B1 | 5/2001 | Driskell |
| 6,285,374 B1 | 9/2001 | Falcon |
| 6,342,877 B1 | 1/2002 | Nikom |
| 6,441,835 B1 | 8/2002 | Pazel |
| 6,489,970 B1 | 12/2002 | Pazel |
| 6,567,070 B1 | 5/2003 | Light |
| 6,693,653 B1 | 2/2004 | Pauly |
| 7,231,609 B2 | 6/2007 | Baudisch |
| 7,475,357 B2 * | 1/2009 | Takeuchi ............ G06F 3/04815 345/619 |
| 7,546,545 B2 | 6/2009 | Garbow |
| 8,826,174 B2 | 9/2014 | Danton |
| 9,582,174 B2 | 2/2017 | Kamiyama |
| 9,582,176 B2 | 2/2017 | Kamiyama |
| 10,409,475 B2 | 9/2019 | Kamiyama |
| 2004/0150664 A1 | 8/2004 | Baudish |
| 2007/0234226 A1 * | 10/2007 | Szeto .................. G06F 3/04842 715/769 |
| 2008/0077874 A1 | 3/2008 | Garbow |
| 2008/0229222 A1 | 9/2008 | Kake |
| 2008/0229224 A1 | 9/2008 | Kake |
| 2009/0088826 A1 | 4/2009 | Bedenbaugh |
| 2009/0210811 A1 | 8/2009 | Saul |
| 2009/0276701 A1 * | 11/2009 | Nurmi .................. G06F 3/0238 715/702 |
| 2010/0083154 A1 * | 4/2010 | Takeshita .............. G06F 19/321 715/769 |
| 2011/0047466 A1 * | 2/2011 | Michelman ............. G06F 9/451 715/734 |
| 2011/0265022 A1 | 10/2011 | Kamiyama |
| 2013/0007647 A1 | 1/2013 | Kamiyama |
| 2017/0153781 A1 | 6/2017 | Kamiyama |

FOREIGN PATENT DOCUMENTS

| | | |
|---|---|---|
| CN | 1920762 B | 9/2011 |
| CN | 102224486 B | 5/2014 |
| EP | 2367096 A4 | 3/2017 |
| JP | H108339286 A | 12/1996 |
| JP | 2006330848 A | 12/2006 |
| JP | 2007257371 A | 10/2007 |
| JP | 2008234053 A | 10/2008 |
| KR | 20110089415 A | 8/2011 |
| TW | 201020901 A | 6/2010 |
| WO | 2010058728 A1 | 5/2010 |

OTHER PUBLICATIONS

WIPO Appln. No. PCT/JP2009/069246 Inernational Preliminary Report on Patentability, dated Jun. 21, 2011, 5 pgs.
WIPO Appln. No. PCT/JP2009/069246 Int'l Search Report, dated Dec. 22, 2009, 2 pg.
CA Patent Appln. 2,739,514 Examination Correspondence, dated Dec. 9, 2015, 6 pg.
U.S. Appl. No. 13/130,356, Non-final Office Action, dated Oct. 18, 2013, 19 pg.
U.S. Appl. No. 13/130,356, Final Office Action, dated Jan. 19, 2014, 27 pg.
U.S. Appl. No. 13/130,356, Examiner's Answer, dated Sep. 22, 2014, 31 pg.
U.S. Appl. No. 13/130,356, Decision on Appeal, dated Aug. 1, 2016, 14 pg.
U.S. Appl. No. 13/130,356, Notice of Allowance, dated Oct. 13, 2016, 8 pg.
U.S. Appl. No. 13/567,477, Non-final Office Action, dated Apr. 28, 2014, 9 pg.
U.S. Appl. No. 13/567,477, Final Office Action, dated Aug. 19, 2014, 9 pg.
U.S. Appl. No. 13/567,477, Advisory Action, dated Nov. 28, 2014, 3 pg.
U.S. Appl. No. 13/567,477, Examiner's Answer, dated May 5, 2015, 11 pg.
U.S. Appl. No. 13/567,477, Decision on Appeal, dated Sep. 29, 2016, 5 pg.
U.S. Appl. No. 13/567,477, Notice of Allowance, dated Oct. 14, 2016, 7 pg.
EP Appln. 09827509.2 Extended Search Report, dated Feb. 20, 2017, 8 pg.
U.S. Appl. No. 15/430,907, Non-Final Office Action, dated Jan. 17, 2019, 19 pg.
U.S. Appl. No. 15/430,907, Notice of Allowance, dated May 1, 2019, 5 pg.

* cited by examiner

MOVING A DRAG OBJECT ON A SCREEN

CROSS-REFERENCE TO RELATED APPLICATIONS

This application is a Continuation of U.S. application Ser. No. 13/567,477, filed on Aug. 6, 2012, which is a Continuation of U.S. application Ser. No. 13/130,356, filed on May 20, 2011, which is the national stage of International Application No. PCT/JP2009/06924, filed Nov. 12, 2009, designating, inter alia, the United States and claiming priority to Japanese Application Number 2008-296834, filed on Nov. 20, 2008, each of which are fully incorporated herein by reference.

BACKGROUND

The present invention relates to a display apparatus, a program, and a display method for moving an object in accordance with an operation of a pointer performed by a user.

Among methods for executing a type of file (file A) using an application (application B) is a method of dragging and dropping an icon indicating the existence of the file onto a start icon of the application B. By adopting such a method, the file A is executed using the application B, even if the file A is not associated with the application B in the operating system.

However, if the application B cannot accept the file A, the file A is not executed, even if the icon of the file A is dropped onto the start icon of the application B. Or, when the icon of the file A is moved onto the start icon of the application B, a not-allowed sign or the like appears, preventing the user from dropping the icon.

Therefore, the user recognizes that the application B cannot execute the file A only after dragging the icon of the file A to the application B. That is, in order to check if a type of file can be executed using any application file, the user must drag an icon of the file to a start icon of the application.

Japanese Unexamined Patent Application Publication No. 09-138732 discloses a related-art example in which when a pointer is moved within a certain range from an object, the pointer is dragged to the object. However, as for the related-art example, the user cannot know whether the object can accept a selected icon unless the user drags the icon at least into the range where the pointer will be dragged.

Also, if the user drags the icon of the file A over a long distance and then drops the icon onto the start icon of the application B so as to execute the file, it takes time before the execution of the file A starts. Since screens are upsized in recent years, an operation burden imposed on a user, that is, a movement of an icon is increased as well.

BRIEF SUMMARY

One embodiment can include a display apparatus for moving a drag object on a screen in accordance with an operation of a pointer. The display apparatus can include a detection unit configured to detect a target object on the screen, the target object being a destination of the drag object. The display apparatus can include a display control unit configured to display the drag object in a position closer to the target object than a display position of the pointer moved in accordance with an operation performed by a user.

Another embodiment can include a display apparatus for moving a drag object on a screen in accordance with an operation of a pointer. The display apparatus can include a detection unit configured to detect at least one target object on the screen, the at least one target object being a destination of the drag object, and a display control unit configured to create a composite vector by obtaining a vector representing an offset amount and an offset direction with respect to each of the detected at least one target object, combine the obtained vectors, and display the drag object in such a manner that the drag object is offset from the pointer to a position specified by the composite vector. As a distance between the pointer and the detected at least one target object becomes shorter, the display control unit can be configured to make an offset amount larger with respect to the corresponding target object. Further, as an association degree representing strength of an association between the drag object and the detected at least one target object(s) becomes higher, the display control unit can make the offset amount larger with respect to the corresponding target object. If the pointer overlaps any one of the detected at least one target object(s), the display control unit can display the drag object in a position matching the pointer.

Another embodiment can include a display apparatus for moving a drag object on a screen in accordance with an operation of a pointer. The display apparatus can include a pointer display unit configured to move a display position of the pointer on the screen in accordance with an operation performed by a user and a display control unit configured to move the drag object by a movement amount larger than a movement amount of the pointer and then display the drag object.

Another embodiment can include a computer program product for moving a drag object on a screen in accordance with an operation of a pointer. The computer program product can include a computer readable storage medium having computer readable program code embodied therewith. The computer readable program code can include computer readable program code configured to move the drag object by a movement amount larger than a movement amount of a pointer, wherein a display position of the pointer is moved in accordance with an operation performed by a user. The computer readable medium further can include computer readable program code configured to then display the drag object.

Another embodiment can include a method of moving a drag object on a screen in accordance with an operation of a pointer. The display method can include moving, using a processor, the drag object by a movement amount larger than a movement amount of a pointer, wherein a display position of the pointer is moved in accordance with an operation performed by a user, and displaying the drag object.

The above-mentioned outlines of the present invention do not list all features essential to the invention and subcombinations of the features can also be included in embodiments of the invention.

DETAILED DESCRIPTION

The present invention will be described using an embodiment thereof. However, the embodiment does not limit the invention as set forth in the appended claims. Also, not all combinations of the features described in the embodiment are essential as a means for solving the above-mentioned problem.

Accordingly, an object of the present invention is to provide a display apparatus, a computer program product, and a display method that are allowed to solve the above-mentioned problem. The object is achieved by combining the features described in the independent claims of the appended claims. Also, the dependent claims define more advantageous, specific examples of embodiments of the present invention.

In order to solve the above-mentioned problem, a first aspect of the present invention provides a display apparatus for moving a drag object on a screen in accordance with an operation of a pointer performed by a user. The display apparatus includes: a detection unit for detecting a target object on the screen, the target object being a destination of the drag object; and a display control unit for displaying the drag object in a position closer to the target object than a display position of the pointer moved in accordance with an operation performed by a user. Also, the first aspect of the present invention provides a computer program product and a display method for causing a computer to function as such a display apparatus.

A second aspect of the present invention provides a display apparatus for moving a drag object on a screen in accordance with an operation of a pointer performed by a user. The display apparatus includes: a pointer display unit for moving a display position of the pointer on the screen in accordance with an operation performed by a user; and a display control unit for moving the drag object by a movement amount larger than a movement amount of the pointer and then displaying the drag object. Also, the second aspect of the present invention provides a computer program product and a display method for causing a computer to function as such a display apparatus.

Figure 1:
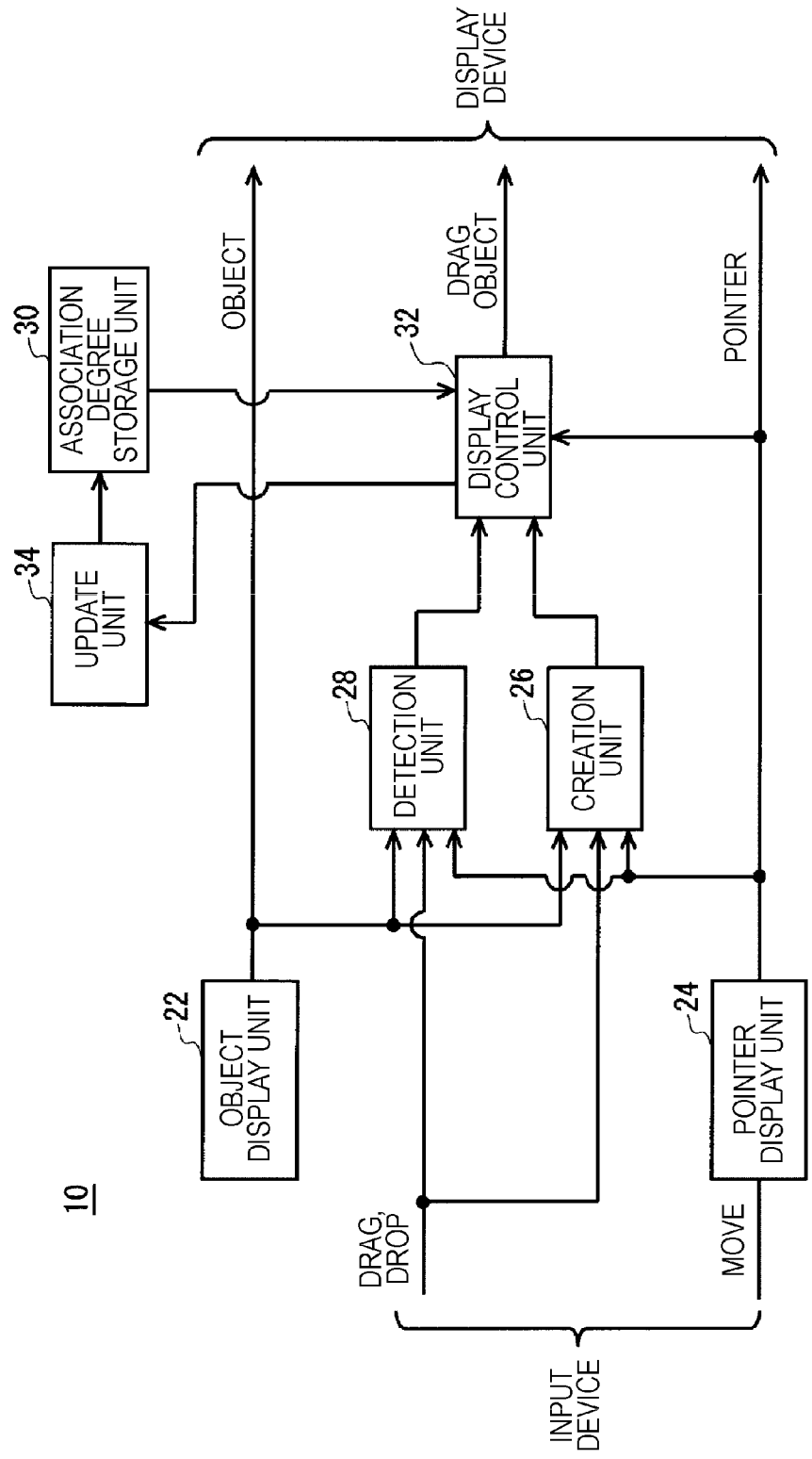
FIG. 1 shows a display apparatus 10 according to an embodiment of the present invention.

FIG. 1 shows a functional configuration of a display apparatus 10 according to this embodiment. The display apparatus 10 receives information indicating an operation of an input device performed by a user and moves a drag object on a screen displayed by a display device, in accordance with the information. The display apparatus 10 is realized, for example, by executing a program using a computer. Such a program for causing a computer to function as the display apparatus 10 may be, for example, a part of the operating system of the computer or a part of an application program.

The display apparatus 10 includes an object display unit 22, a pointer display unit 24, a creation unit 26, a detection unit 28, an association degree storage unit 30, a display control unit 32, and an update unit 34. The object display unit 22 displays multiple objects on a screen. The object display unit 22 may display, for example, a file icon indicating the existence of a file, a start icon for starting an application, and the like on the screen.

The pointer display unit 24 displays a pointer on the screen. Also, the pointer display unit 24 moves the display position of the pointer in accordance with an operation performed by the user using an input device such as a mouse.

When the user drags an object displayed on the screen, using an input device, the creation unit 26 displays a drag object indicating that the object is being dragged, on the screen. For example, if the user moves an object displayed on the screen while pressing the left button of the mouse, the creation unit 26 displays a drag object on the screen.

For example, the creation unit 26 may display a drag object, which is a copy of an object, on the screen while displaying the object, which is a subject of a drag operation, in the original position. Alternatively, the creation unit 26 may delete the original object, which is a subject of a drag operation, and display only a drag object on the screen.

The detection unit 28 detects, on the screen, at least one target object that is the destination of a drag object displayed by the creation unit 26. For example, the detection unit 28 may detect, as target objects, all objects other than an object that is a subject of a drag operation, among objects displayed on the screen by the object display unit 22. As another example, the detection unit 28 may detect, as a target object, a particular type of objects other than an object that is a subject of a drag operation, among objects displayed on the screen by the object display unit 22.

The association degree storage unit 30 stores association degrees indicating the strengths of associations between each of the types of target objects displayed on the screen and each of the drag objects displayed on the screen. For example, if objects have a strong association with each other, the association degree storage unit 30 stores a high association degree with respect to the objects; if the objects have a weak association with each other, it stores a low association degree with respect thereto. For example, the display control unit 32 may set a high association degree with respect to a music file and a music player, a medium association degree with respect to a music file and a video application, and a low association degree with respect to a music file and an image edit application.

If the user drags an object displayed on the screen using an input device, the display control unit 32 moves a drag object in accordance with a movement of the pointer. In this case, the display control unit 32 displays the drag object in a position closer to the target object than the display position of the pointer moved in accordance with an operation performed by the user. For example, the display control unit 32 sets an offset amount by which a drag object 48 is offset from a pointer 42 in a direction close to a target object 46, on the basis of a corresponding association degree stored in the association degree storage unit 30.

If the user moves a drag object to a target object, the update unit 34 updates a corresponding association degree stored in the association degree storage unit 30. For example, if the frequency with which a type of drag object is moved to a type of target object becomes a predetermined frequency or more, the update unit 34 may make higher a corresponding association degree stored in the association degree storage unit 30.

Figure 2:
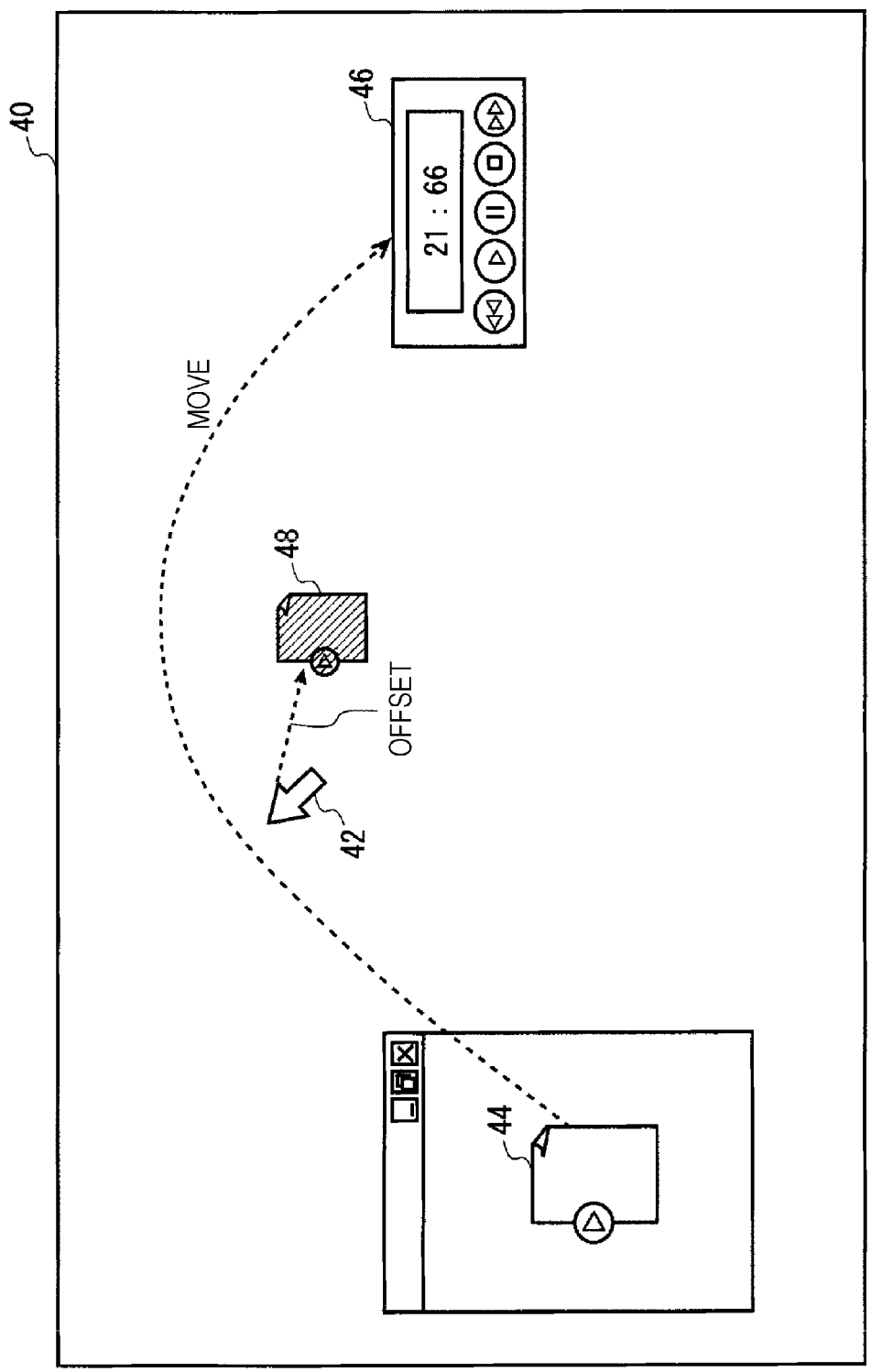
FIG. 2 shows an example of a pointer 42 and a drag object 48 displayed on a screen 40 by the display apparatus 10 when a first object is dragged and dropped onto a second object.

FIG. 2 shows an example of the pointer 42 and drag object 48 displayed on the screen 40 by the display apparatus 10 when dragging and dropping a first object (source object 44) onto a second object (target object 46). As shown in FIG. 2, when dragging the source object 44 to the target object 46, the display control unit 32 of the display apparatus 10 displays the drag object 48 in such a manner that the drag object 48 is offset from the display position of the pointer 42 to a position close to the target object 46.

As the association degree between the drag object 48 and target object 46 becomes higher, the display control unit 32 makes larger the offset amount by which the drag object 48 is offset from the pointer 42 to a position close to the target object 46. For example, if the drag object 48 is an icon indicating a music file and the target object 46 is a start icon of a music player having a strong association with the music file, the display control unit 32 increases the offset amount. In contrast, if the drag object 48 is an icon indicating a music file and the target object 46 is an image edit application having a weak association with the music file, the display control unit 32 reduces the offset amount. Further, if the drag object 48 is an icon indicating a music file and the target object 46 is an application that can accept no music file, the display control unit 32 may set the offset amount to zero.

In this case, the display control unit 32 offsets the drag object 48 in a direction from the pointer 42 to the target object 46. If only one target object 46 is displayed on the screen 40, the display control unit 32 may display the drag object 48, for example, on a line linking the pointer 42 and target object 46.

Thus, the display apparatus 10 allows the user to recognize whether the target object 46 can accept the drag object 48 as well as recognize the strength of the association between these objects before overlaying the drag object 48 on the target object 46. Also, the display apparatus 10 allows the drag object 48 to reach the target object 46 ahead of the pointer 42, thereby reducing the drag distance.

Also, as the distance between the pointer 42 and target object 46 becomes shorter, the display control unit 32 may make the offset amount larger. When the user brings the pointer 42 closer to the target object 46 during a drag, there is a high possibility that the user wants to move the drag object 48 to the target object 46. Therefore, by adopting the above-mentioned configuration, the display control unit 32 can move the drag object 48 to a position closer to the target object 46.

Also, the display control unit 32 may calculate the offset amount on the basis of gravity force caused between the drag object 48 and target object 46 in a case where the degree of the association between the drag object 48 and target object 46 is considered as the mass of the drag object 48 and target object 46. For example, the display control unit 32 may set the offset amount by which the drag object 48 is offset from the pointer 42 in a direction close to the target object 46, on the basis of a value proportional to the association degree between the drag object 48 and target object 46 and inversely proportional to a power (e.g., square) of the distance between the drag object 48 and target object 46. Thus, the display control unit 32 provides the user a drag operation such that the drag object 48 moves toward the target object 46 at a higher speed as the drag object 48 becomes closer to the target object 46.

Figure 3:
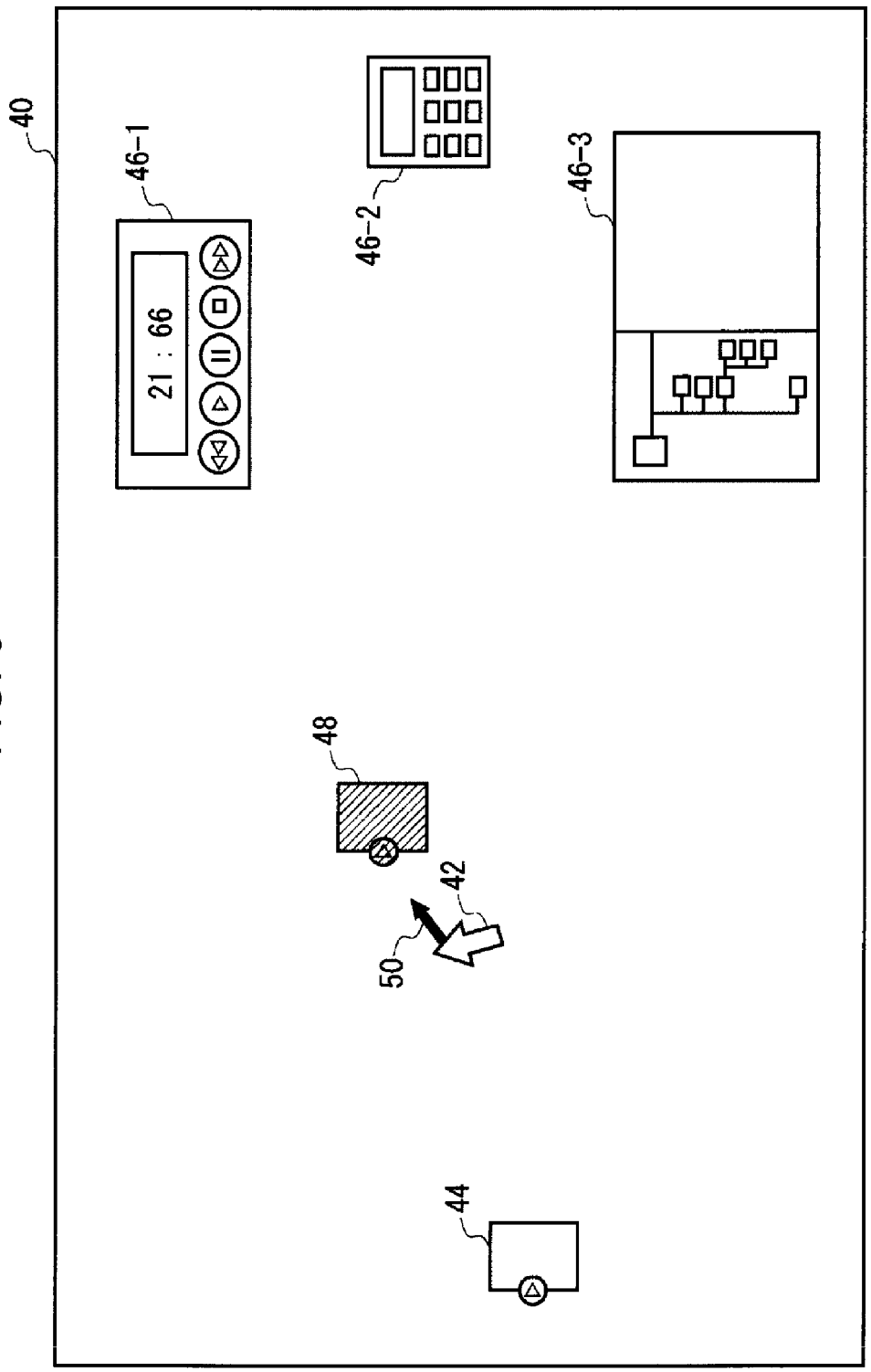
FIG. 3 shows an example of a source object 44 and the drag object 48 displayed on the screen 40 by the display apparatus 10 in a case where multiple target objects 46 are displayed on the screen 40.

FIG. 3 shows an example of the source object 44 and drag object 48 displayed on the screen 40 by the display apparatus 10 in a case where multiple target objects 46 are displayed on the screen 40. The detection unit 28 may detect at least one target object 46. In an example shown in FIG. 3, the detection unit 28 is detecting three target objects 46 (46-1, 46-2, and 46-3).

In this case, the display control unit 32 creates a composite vector by obtaining a vector representing the offset amount and offset direction with respect to each of the detected at least one target object 46 and then combining the obtained vectors, and displays the drag object 48 in such a manner that the drag object 48 is offset from the pointer 42 to a position specified by the composite vector. For example, the display control unit 32 calculates a vector representing the offset amount and offset direction with respect to each of the detected at least one target object 46, assuming that there are no other target objects 46. Subsequently, the display control unit 32 creates a composite vector by combining the calculated vectors. Subsequently, the display control unit 32 identifies the position of the composite vector with the position of the pointer 42 used as the origin point and displays the drag object 48 in the identified position.

Thus, if multiple target objects 46 are displayed, the display control unit 32 displays the drag object 48 in such a manner that the drag object 48 is offset in a direction toward a target object 46 having the strongest association with the drag object 48. Therefore, when multiple target objects 46 are displayed, the display control unit 32 allows the user to recognize which of the target objects 46 the drag object 48 has the strongest association with.

The display control unit 32 may display a direction object 50 indicating a direction from the pointer 42 to the drag object 48. Thus, the display control unit 32 allows the user to more easily recognize the position of a target object 46 having a strong association.

Also, if the pointer 42 overlaps any target object 46, the display control unit 32 may display the drag object 48 in a position matching the pointer 42. Thus, even if the drag object 48 is dragged onto a target object 46 having a weak association, the display control unit 32 can display the drag object 48 in such a manner that the drag object 48 overlaps the target object 46.

The display control unit 32 may reduce the association degree with respect to a target object 46 having more types of acceptable drag objects 48. Thus, the display control unit 32 can display the drag object 48 while reducing the offset amount by which the drag object 48 is offset toward an object having many types of acceptable objects, such as a file management application (e.g., Explorer). This allows the user to recognize a direction toward an object for exclusive use.

Also, if multiple drag objects 48 are collectively moved, the display control unit 32 may increase the association degree with respect to a target object 46 having more types of acceptable drag objects 48. Thus, the display control unit 32 allows the user to recognize a direction toward a versatile object, such as a file management application.

Figure 4:
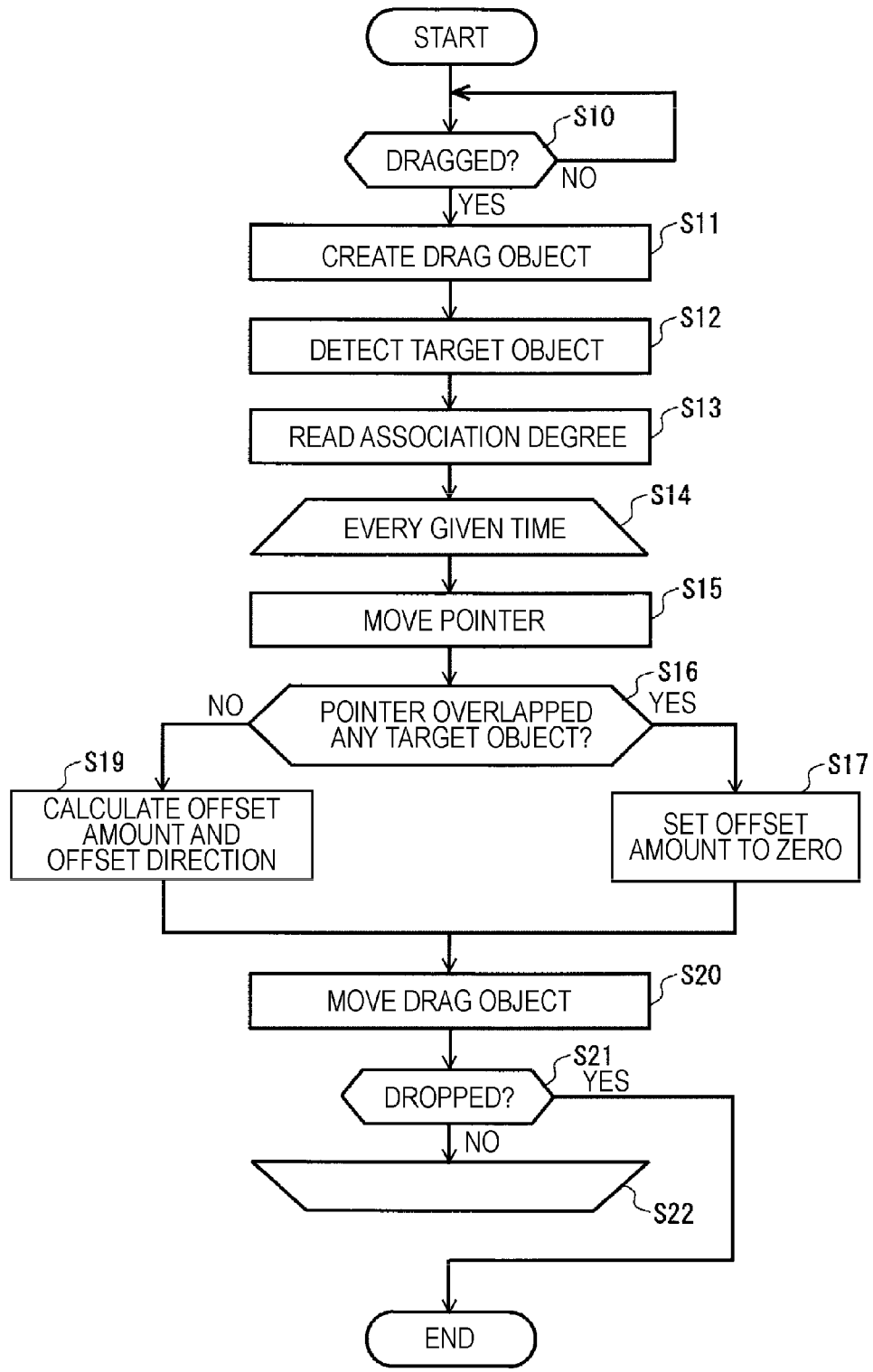
FIG. 4 is an example of a flow of a process performed by the display apparatus 10 according to this embodiment.

FIG. 4 is an example of a flow of a process performed by the display apparatus 10 according to this embodiment. First, the creation unit 26 of the display apparatus 10 waits for the process until any object displayed on the screen is dragged (S10).

If any object is dragged, the creation unit 26 creates a drag object with respect to the dragged object (S11). Subsequently, the detection unit 28 detects at least one target object (S12). Subsequently, the display control unit 32 reads, from the association degree storage unit 30, the association degrees between the drag object and each of the detected at least one target object (S13).

Subsequently, the display apparatus 10 repeatedly performs a loop process from step S15 to step S21 every given time (e.g., each time a pointer is moved) (S14, S22). First, the pointer display unit 24 moves the pointer to a position according to an operation performed by the user (S15).

Subsequently, the display control unit 32 determines whether the pointer has overlapped any target object (S16). If the pointer has overlapped any target object (YES in S16), the display control unit 32 sets the offset amount to zero (S17).

In contrast, if the pointer has overlapped no target object (NO in S16), the display control unit 32 calculates an offset amount and an offset direction for offsetting the drag object from the pointer (S19). For example, the display control unit 32 calculates a vector representing the offset amount and offset direction with respect to each of the detected target objects using the association degree between the drag object and each of the target objects as well as using the position of the drag object and that of each of the target objects, and calculates a composite vector by combining the calculated vectors. The display control unit 32 may calculate the offset amount and offset direction from the pointer, on the basis of the composite vector.

When step 17 or 19 is completed, the display control unit 32 moves the drag object using the result of step S17 or 19 (S20). Subsequently, the display control unit 32 determines whether the drag object has been dropped (S21). If the drag object has not been dropped (NO in S22), the display control unit 32 returns the process to step S15 to repeat the loop process. If the drag object has been dropped, the display control unit 32 completes the flow without repeating the loop process.

By adopting the display apparatus 10 according to this embodiment as described above, the drag object is displayed in such a manner that the drag object is offset from the pointer by an offset amount corresponding to the strength of association and in an offset direction toward a target object having a strong association with the drag object. Thus, the display apparatus 10 allows the user to recognize the target object having a strong association with the drag object.

Figure 5:
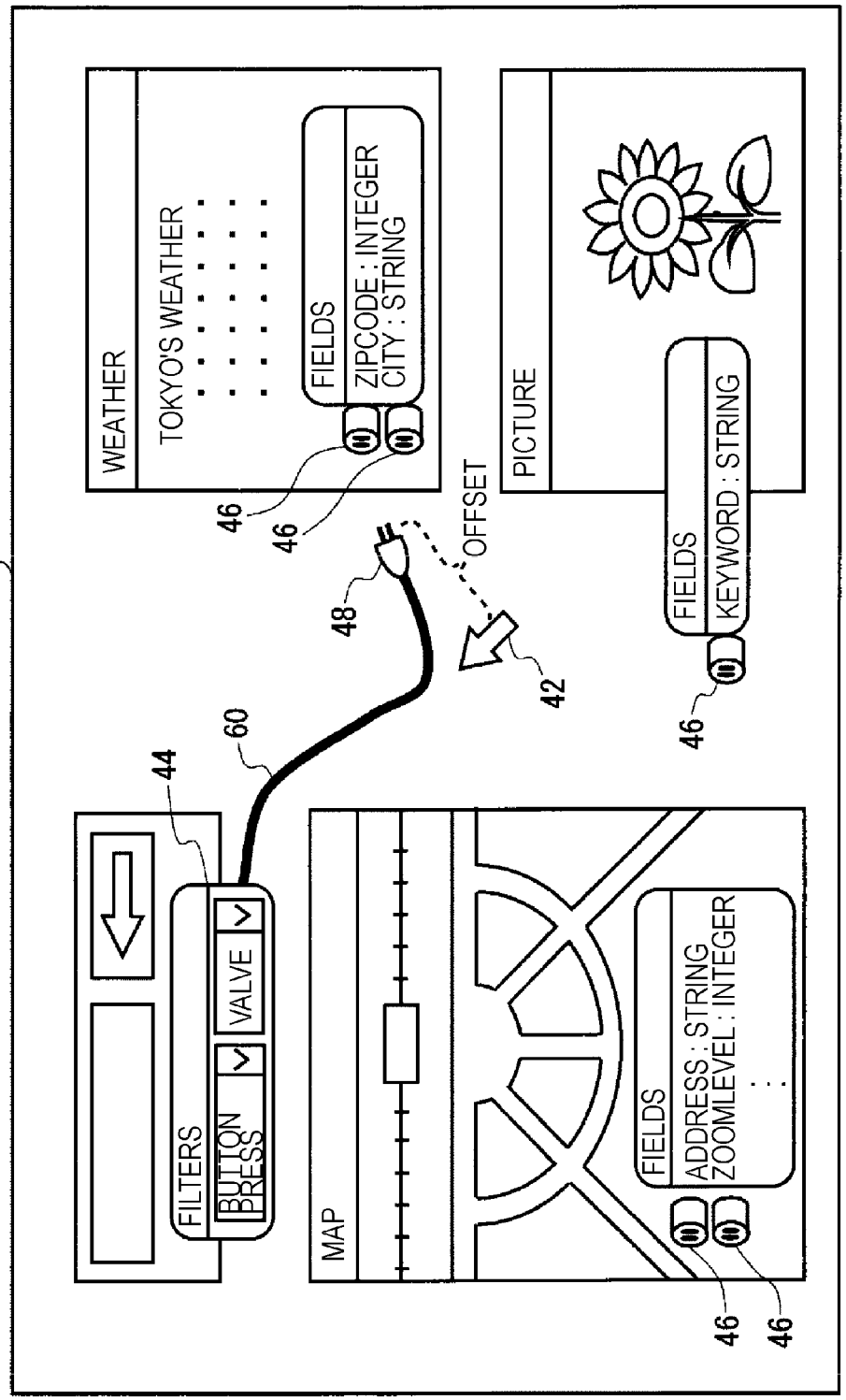
FIG. 5 shows an example of the edit screen 40 for editing a web page to be provided in a mashup service.

FIG. 5 shows an example of the edit screen 40 for editing a web page to be provided in a mashup service. A service, called "mashup," for displaying services provided by multiple servers in one web page is known.

In a process for editing a mashed-up web page, a process, called "wiring," for associating objects displayed on a web page with each other is performed. In wiring, when an object (source object 44), which is a link source, is dragged, a plug-shaped drag object 48 is displayed. The plug-shaped drag object 48 moves in conjunction with a movement of the pointer 42. Also, wire 60 linking the plug-shaped drag object 48 and source object 44 is displayed.

Also, a connector-shaped object (target object 46), which is a link destination, is displayed. Subsequently, the user moves the plug-shaped drag object to insert the drag object into any connector-shaped target object 46. In this way, these objects are associated with each other.

If the plug-shaped drag object 48 is dragged in such wiring, the display apparatus 10 according to this embodiment displays the plug-shaped drag object 48 in such a manner that the plug-shaped drag object 48 is offset from the display position of the pointer 42 to a position close to the target object 46. Also, the display apparatus 10 displays the plug-shaped drag object 48 in such a manner that the plug-shaped drag object 48 is directed in the offset direction, as well as deforms the wire 60 in accordance with the offset direction. This improves user operability in wiring.

More specifically, FIG. 5 shows an example of an edit for associating a search tool with map data, weather data, and picture data. If the data format for the search box and the data format for an input field of each search target object are matched, the display control unit 32 may increase the association degree; if not matched, the display control unit 32 may reduce the association degree. Also, if the data formats are matched but the semantics of the data are different, for example, if the data format for the search box is a character string-type search keyword and the field of an object that is a subject of search is a character string-type URL (uniform resource locator), the display control unit 32 may set the association degree to a medium degree.

Figure 6:
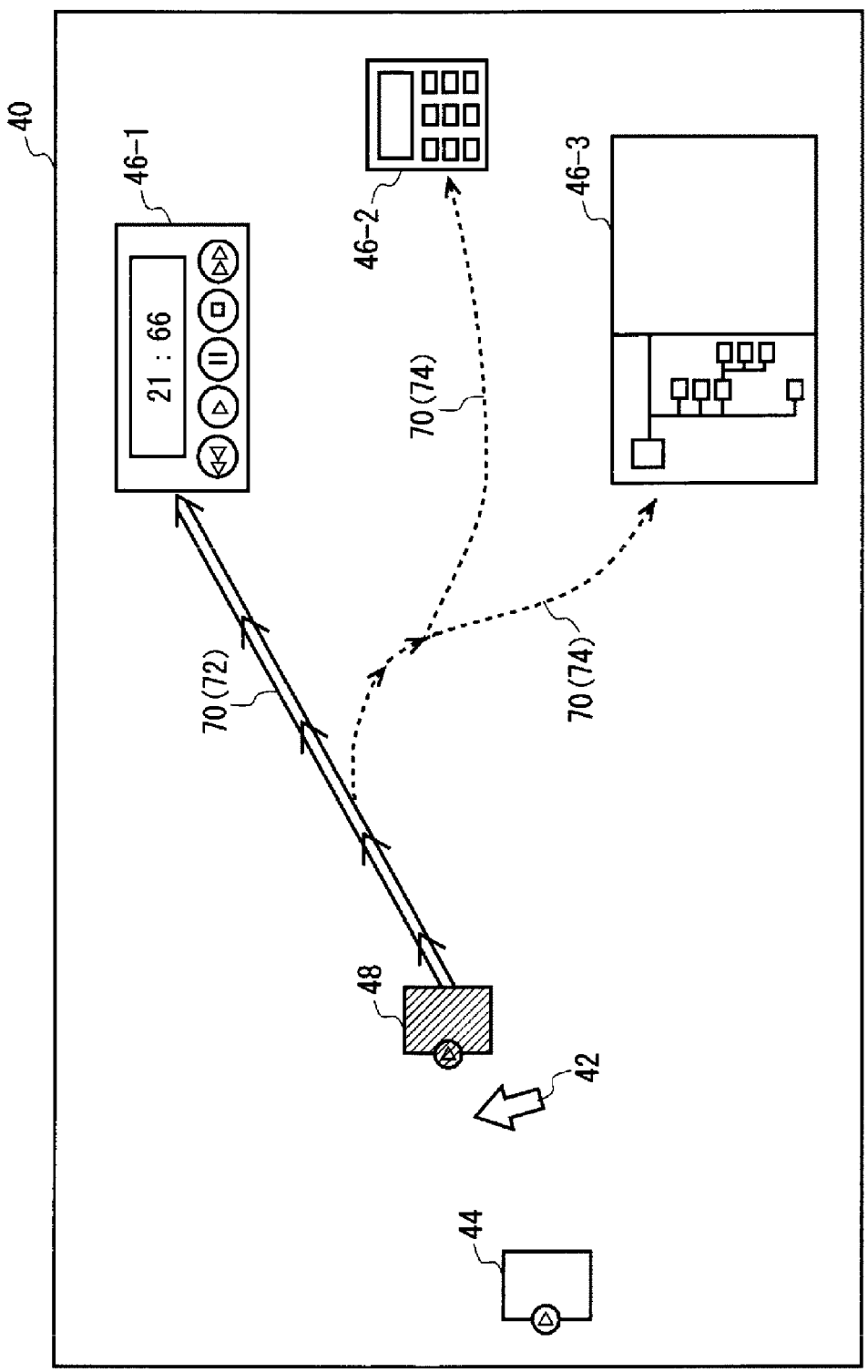
FIG. 6 shows another example of the screen 40 displayed by the display apparatus 10.

FIG. 6 shows another example of the screen 40 displayed by the display apparatus 10. As shown in FIG. 6, the display control unit 32 may select a target object 46 having an offset amount equal to or larger than a predetermined amount from among detected at least one target object 46 and display a path from the drag object 48 to the selected target object 46. Alternatively, the display control unit 32 may select target objects 46 having the first to predetermined number'th largest offset amounts from among detected at least one target object 46 and display paths from the drag object 48 to the selected target objects 46. Thus, the display control unit 32 allows the user to more easily recognize the positions of the target objects 46 having strong associations.

In this case, the display control unit 32 may define a path 70 to a target object 46 having the largest offset amount as a priority path 72 and define paths 70 other than the priority path 72 as non-priority paths 74. The display control unit 32 may display the priority path 72 using a straight line from the drag object 48 to the target object 46 having the largest offset amount. Also, the display control unit 32 may display the non-priority paths 74 as branches of the priority path 72. Further, the display control unit 32 may display the priority path 72 using a solid line and display the non-priority paths 74 using dotted lines, thin lines, or the like.

Also, the display control unit 32 may update the path 70 in conjunction with a movement of the drag object 48. For example, if the target objects 46 having the first to predetermined number'th largest offset amounts are changed to others due to a movement of the drag object 48, the display control unit 32 may display paths to the other target objects 46.

If the drag object 48 is dropped on the priority path 72, the display control unit 32 may automatically move the drag object 48 to the target object 46 along the priority path 72. Thus, the display control unit 32 allows the user to move the drag object 48 to an intended position with fewer operations.

Also, in addition to the paths 70 or instead of the paths 70, the display control unit 32 may display, with respect to each target object 46, a set of concentric circles with the target object 46 as the center. In this case, the display control unit 32 displays each set of concentric circles in such a manner that intervals between concentric circles more distant from the center are made larger and that a target object 46 having a stronger association with the drag object 48 has concentric circles having shorter intervals. As a result, the display control unit 32 makes a display resembling a gravitational field around each target object 46, as well as makes a display as if a target object 46 having a stronger association had a stronger gravitational field.

Figure 7:
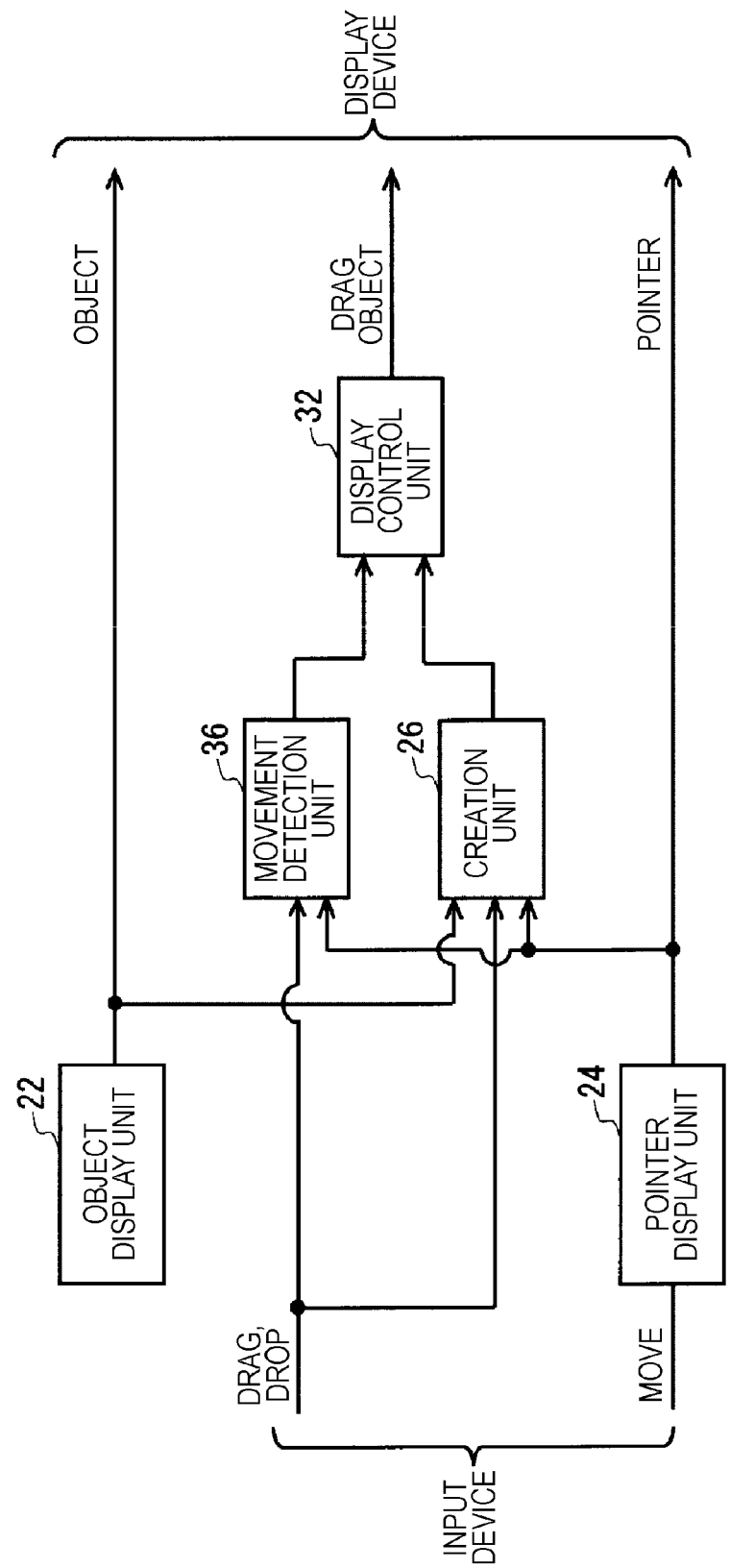
FIG. 7 shows a configuration of a display apparatus 10 according to a first modification of this embodiment.

FIG. 7 shows a configuration of a display apparatus 10 according to a first modification of this embodiment. Since the display apparatus 10 according to this modification has a configuration and functions approximately identical to those of the display apparatus 10 according to this embodiment, like elements are assigned like reference numerals and only the differences between the display apparatus 10 according to this modification and that according to this embodiment will be described.

The display apparatus 10 includes an object display unit 22, a pointer display unit 24, a creation unit 26, a display control unit 32, and a movement detection unit 36. The movement detection unit 36 detects a movement of the pointer. The movement detection unit 36 may detect, for example, the movement trajectory of the pointer. Alternatively, the movement detection unit 36 may detect the movement speed of the pointer.

If a user drags an object displayed on the screen using an input device, the display control unit 32 moves a drag object in the movement direction of the pointer by a movement amount larger than the movement amount of the pointer, and displays the drag object. That is, the display control unit 32 displays the drag object in such a manner that the drag object is offset from the pointer in the movement direction of the pointer.

Figure 8:
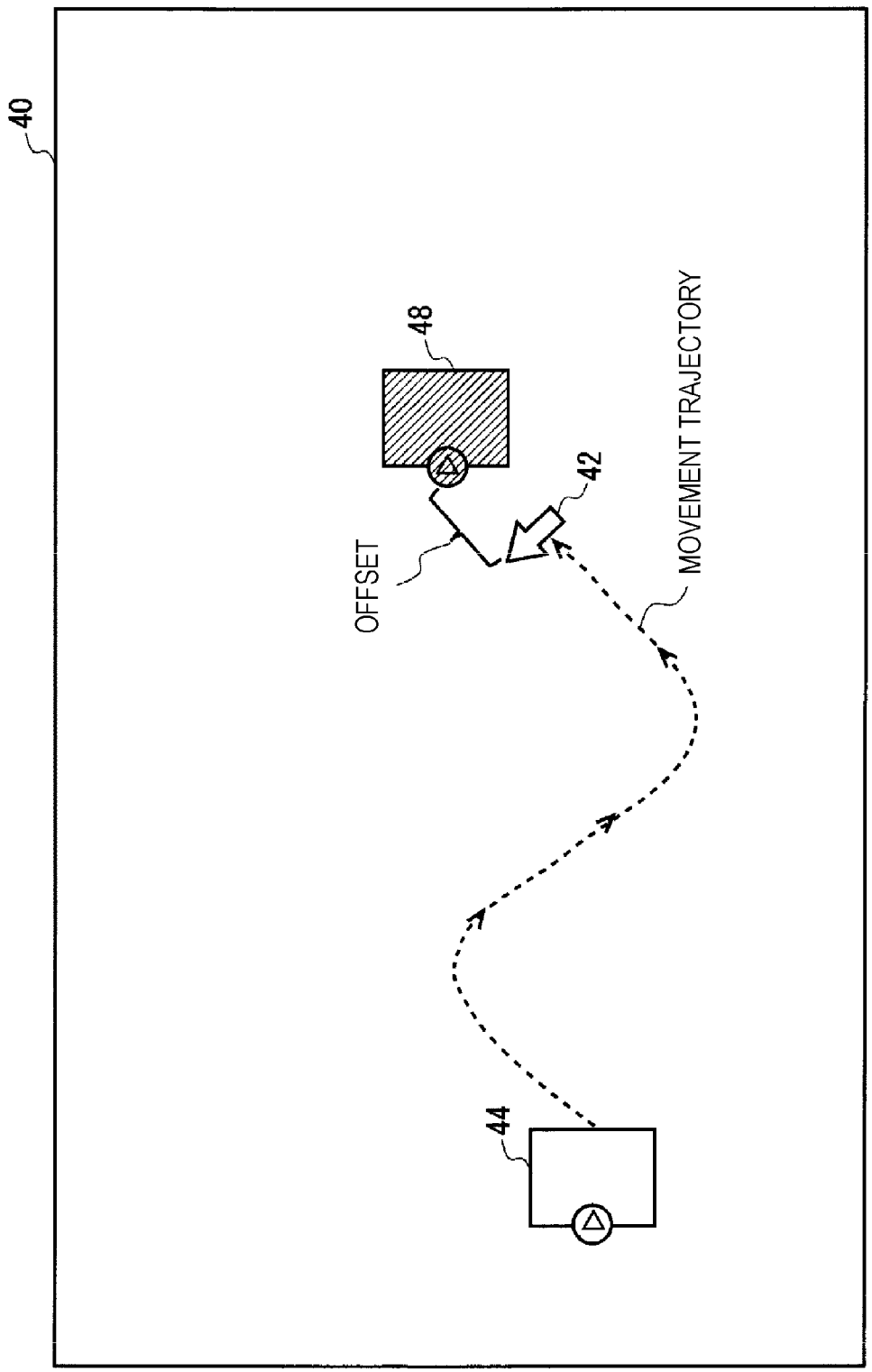
FIG. 8 shows an example of a pointer 42 and a drag object 48 displayed on a screen 40 by the display apparatus 10 according to the first modification.

FIG. 8 shows an example of a pointer 42 and a drag object 48 displayed on a screen 40 by the display apparatus 10 according to the first modification. The display control unit 32 may detect the movement trajectory of the pointer 42 during a drag and display the pointer 42 on a future movement position estimated from the detected movement trajectory. Also, the display control unit 32 may detect the movement trajectory corresponding to a period from the present time to a predetermined time or may detect the movement trajectory corresponding to a period from the present time to a drag start time.

The display control unit 32 may display the drag object 48 in a position offset from the pointer 42 by a predetermined offset amount on an extension of the movement trajectory. Also, the display control unit 32 may estimate an extension of the movement trajectory, for example, by calculating such as a function representing a tangent to the movement trajectory.

The display control unit 32 may display the drag object 48 in a position offset from the pointer 42 by a fixed offset amount. Also, the display control unit 32 may detect the movement speed of the pointer 42 to change the offset amount in accordance with the movement speed. For example, if the movement speed is high, the display control unit 32 may increase the offset amount; if the movement speed is low, it may reduce the offset amount. By adopting the display apparatus 10 according to the first modification as described above, the drag object 48 reaches the target object 46 ahead of the pointer 42 so that the drag distance is reduced.

Figure 9:
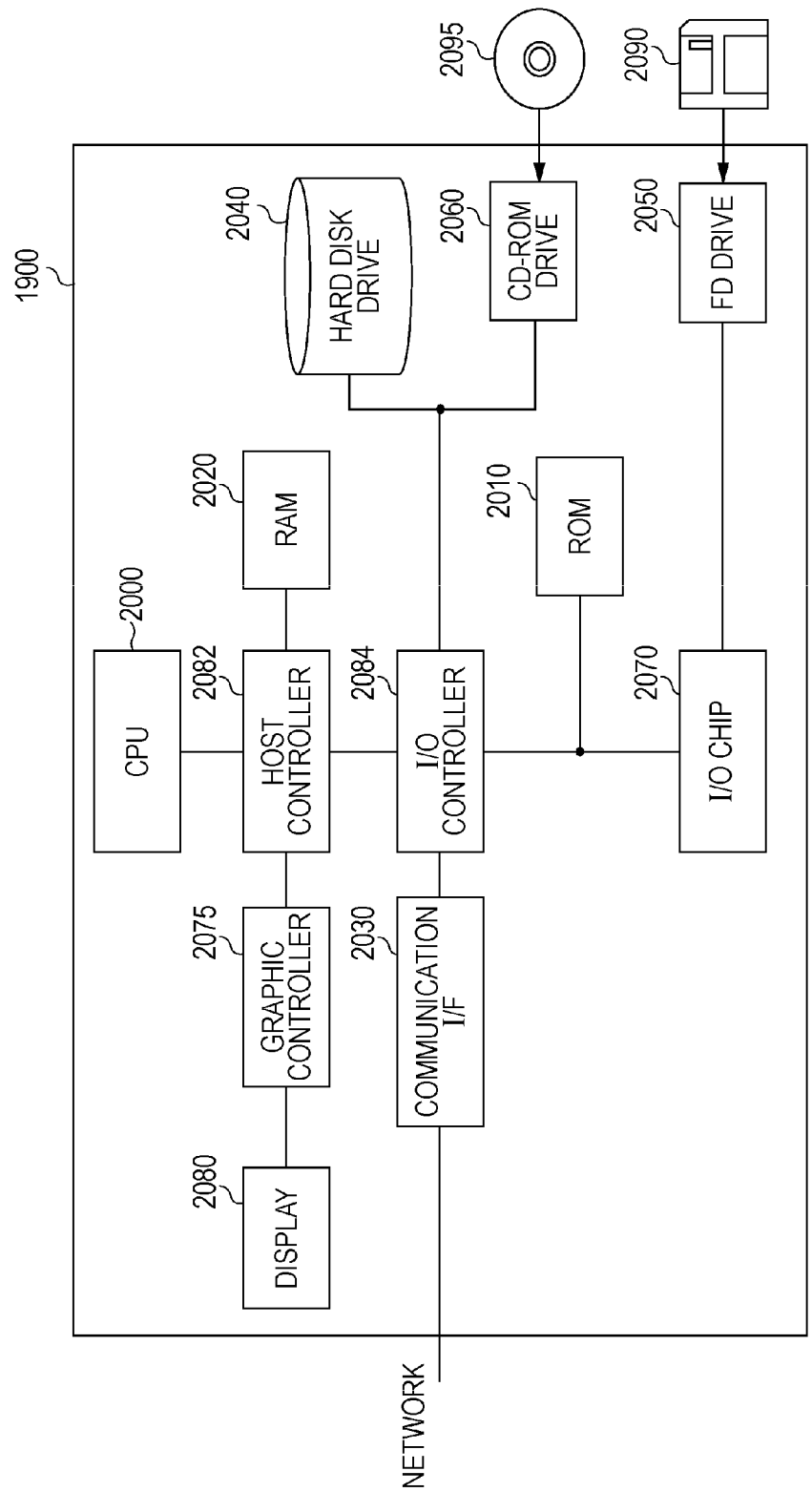
FIG. 9 shows an example hardware configuration of a computer 1900 according to this embodiment.

FIG. 9 shows an example hardware configuration of a computer 1900 according to this embodiment. The computer 1900 according to this embodiment includes a CPU peripheral unit, an input/output unit, and a legacy input/output unit. The CPU peripheral unit includes a CPU 2000, a RAM 2020, a graphic controller 2075, and a display 2080, which are coupled to one another via a host controller 2082. The input/output unit includes a communication interface 2030, a hard disk drive 2040, and a CD-ROM drive 2060, which are coupled to the host controller 2082 via an input/output controller 2084. The legacy input/output unit includes a ROM 2010, a flexible disk drive 2050, and an input/output chip 2070, which are coupled to the input/output controller 2084.

The host controller 2082 couples between the RAM 2020, and the CPU 2000 configured to access the RAM 2020 at a high transfer rate and the graphic controller 2075. The CPU 2000 operates on the basis of programs stored in the ROM 2010 and RAM 2020 so as to control each component. The graphic controller 2075 acquires image data generated by the CPU 2000 or the like on a frame buffer provided in the RAM 2020 and displays the acquired image data on the display 2080. Alternatively, the graphic controller 2075 may include a frame buffer for storing image data generated by the CPU 2000 or the like.

The input/output controller 2084 couples between the host controller 2082, and the communication interface 2030, which is a relatively high-speed input/output device, hard disk drive 2040, and CD-ROM drive 2060. The communication interface 2030 communicates with other apparatuses via a network. The hard disk drive 2040 stores a program and data to be used by the CPU 2000 of the computer 1900. The CD-ROM drive 2060 reads out a program or data from the CD-ROM 2095 and provides the read-out program or data to the hard disk drive 2040 via the RAM 2020.

Coupled to the input/output controller 2084 are the ROM 2010, flexible disk drive 2050, and relatively low-speed input/output devices of the input/output chip 2070. The ROM 2010 stores a boot program to be executed when the computer 1900 starts up, and/or a program dependent on the hardware of the computer 1900. The flexible disk drive 2050 reads out a program or data from the flexible disk 2090 and provides the read-out program or data to the hard disk drive 2040 via the RAM 2020. The input/output chip 2070 couples the flexible drive 2050 to the input/output controller 2084, as well as couples various input/output devices to the input/output controller 2084, for example, via a parallel port, a serial port, a keyboard port, a mouse port, and the like.

For example, a program stored in a recoding medium such as the flexible disk 2090, CD-ROM 2095, or an integrated circuit (IC) card is installed into the hard disk drive 2040 via the RAM 2020 by the user and then executed by the CPU 2000.

A program installed into the computer 1900 and intended to cause the computer 1900 to function as the display apparatus 10 includes an object display module, a pointer display module, a creation module, a detection module, a display control module, an update module, and an association degree module. Alternatively, this program may include an object display module, a pointer display module, a creation module, a detection module, a display control module, and a movement detection module. This program or these modules operates the CPU 2000 and the like so as to cause the computer 1900 to function as the object display unit 22, pointer display unit 24, creation unit 26, detection unit 28, association degree storage unit 30, display control unit 32, update unit 34, and movement detection unit 36.

In other words, when information written in this program is read by the computer 1900, the object display unit 22, pointer display unit 24, creation unit 26, detection unit 28, association degree storage unit 30, display control unit 32, update unit 34, and movement detection unit 36, which are specific means where software and the above-mentioned various hardware resources collaborate with each other, are realized. Also, by performing operations on information or processing information using these specific means in accordance with the use objective of the computer 1900 according to this embodiment, a unique display apparatus 10 according to the use objective is constructed.

For example, when communications are performed between the computer 1900 and an external apparatus or the like, the CPU 2000 executes a communication program loaded in the RAM 2020 and, on the basis of a process written in the communication program, instructs the communication interface 2030 to perform a communication process. Under the control of the CPU 2000, the communication interface 2030 reads out transmission data stored in a transmission buffer area or the like provided in a storage device such as the RAM 2020, hard disk drive 2040, flexible disk 2090, or CD-ROM 2095 and transmits the read-out transmission data to a network, or writes reception data received via a network into a reception buffer area or the like provided in a storage device. As described above, the communication interface 2030 may transmit transmission data to a storage device or receive reception data from a storage device using the DMA (direct memory access) method. Alternatively, the CPU 2000 may read out data from a storage device or the communication interface 2030, which is the transmission source, and may write the read-out data into the communication interface 2030 or a storage device, which is the transmission destination, so as to transfer transmission data or reception data.

Also, the CPU 2000 loads all or necessary ones of files, databases, and the like stored in an external storage device such as the hard disk drive 2040, CD-ROM drive 2060 (CD-ROM 2095), or flexible disk drive 2050 (flexible disk 2090) into the RAM 2020 using DMA transfer or the like and performs various processes on the data loaded in the RAM 2020. Then, the CPU 2000 writes the resultant data back into the external storage device using DMA transfer or the like. In such a process, the RAM 2020 is considered as a device for temporarily retaining the data stored in the external storage device. Therefore, in this embodiment, the RAM 2020, external storage devices, and the like are each referred to as a "memory," a "storage unit," a "storage device," or the like. In this embodiment, various programs and various types of information such as data, tables, and databases are stored in these storage devices and are subjected to information processing. Incidentally, the CPU 2000 may read or write data from or into a cache memory retaining a part of the RAM 2020. In this case, the cache memory also plays a part of the function of the RAM 2020. Therefore, in this embodiment, the cache memory is referred to as the "RAM 2020," a "memory," or a "storage device," except for a case where the cache memory and RAM 2020 or the like are shown independently.

Also, the CPU 2000 performs various processes that are specified by command strings in a program and include various operations, information processing, condition judgment, and retrieval or replacement of information described in this embodiment, on data read out from the RAM 2020 and then writes the resultant data back into the RAM 2020. For example, if the CPU 2000 performs condition judgment, it judges whether each variable shown in this embodiment meets a condition such as a condition that the variable must be larger, smaller, equal to or larger than, equal to or smaller than, or equal to other variables or constants. If the condition is met (or unmet), the condition judgment is branched to a different command string or a sub-routine is called.

Also, the CPU 2000 is allowed to retrieve information included in a file, a database, or the like stored in a storage device. For example, if multiple entries in which the attribute value of a first attribute and that of a second attribute are associated with each other are stored in a storage device, the CPU 2000 retrieves an entry in which the attribute value of the first attribute meets a specified condition, from among the multiple entries and reads out the attribute value of the second attribute stored in the entry. Thus, the CPU 2000 obtains the attribute value of the second attribute associated with the first attribute meeting the specified condition.

The above-mentioned program or modules may be stored in an external recording medium. Among such recording media are the flexible disk 2090 and CD-ROM 2095 as well as an optical recording medium such as a digital versatile disc (DVD) or a compact disc (CD), a magneto-optical recording medium such as a magneto-optical (MO) disk, a tape medium, and a semiconductor memory such as an IC card. Also, a storage device, such as a hard disk or a random access memory (RAM), provided in a server system connected to a dedicated communication network or the Internet may be used as a recording medium and the above-mentioned program stored in such a storage device may be provided to the computer 1900 via a network.

While the present invention has been described using the embodiment thereof, the technical scope of the invention is not limited to the description of the above-mentioned embodiment. It will be apparent for those skilled in the art that various changes and modifications can be made to the above-mentioned embodiment. Also, it will be apparent from the description of the appended claims that such changed or modified embodiments can also fall within the technical scope of the invention.

Also, it should be noted that there is no specific description, such as "perform an operation before performing another operation," about the order of performance of the processes, such as operations, steps, and stages, of the apparatus(es), system(s), program(s), and/or method(s) described in the appended claims, specification, and accompanying drawings and that these processes can be performed in any order unless an output produced in a preceding process is used in a subsequent process. While the flow of operations is described using terms such as "first," "then," and the like in the claims, specification, and drawings for convenience sake, the operations do not always need to be performed in that order.

The invention claimed is:

1. A computer-implemented method of moving a drag object on a screen in accordance with an operation of a pointer, comprising:
   detecting a target object on the screen, the target object being a destination of the drag object; and
   displaying the drag object in a position closer to the target object than a display position of the pointer moved in accordance with the operation user, wherein
   the displaying creates an offset amount between the display position of the drag object and the display position of the pointer, and
   the offset amount becomes higher based upon a capability of the target object to accept the drag object.

2. The method of claim 1, further comprising
   increasing the offset amount as a distance between the pointer and the target object becomes shorter.

3. The method of claim 1, wherein
   the target object is a music player, and
   the drag object is a music file.

4. The method of claim 1, wherein
   the offset amount is based upon a value
     proportional to an association degree representing strength of an association between the drag object and the target object and
     inversely proportional to a power of a distance between the drag object and the target object.

5. The method of claim 1, further comprising
   obtaining, for each of a plurality of detected target objects, a vector representing an offset amount and an offset direction; and
   combining the vectors to generate a composite vector, wherein
   the drag object is displayed relative to the pointer based upon the composite vector.

6. The method of claim 5, wherein
the drag object is displayed in a position matching the pointer upon the pointer overlapping any one of the plurality of detected target objects.

7. The method of claim 1, further comprising
displaying a direction object indicating a direction from the pointer to the drag object.

8. The method of claim 1, further comprising
selecting, from a plurality of detected target objects, a target object having an offset amount equal to or larger than a predetermined amount; and
displaying a path from the drag object to the selected target object.

9. The method of claim 8, further comprising:
updating the path based upon a movement of the drag object.

10. The method of claim 8, wherein
the movement amount of the drag object, which is larger than the movement amount of the pointer, occurs while the pointer is being moved.

11. A computer hardware system configured to move a drag object on a screen in accordance with an operation of a pointer, comprising:
at least one hardware processor configured to initiate the following operations:
detecting a target object on the screen, the target object being a destination of the drag object; and
displaying the drag object in a position closer to the target object than a display position of the pointer moved in accordance with the operation user, wherein
the displaying creates an offset amount between the display position of the drag object and the display position of the pointer, and
the offset amount becomes higher based upon a capability of the target object to accept the drag object.

12. The system of claim 11, wherein the at least one hardware processor is further configured to initiate the following operation:
increasing the offset amount as a distance between the pointer and the target object becomes shorter.

13. The system of claim 11, wherein
the target object is a music player, and
the drag object is a music file.

14. The system of claim 11, wherein
the offset amount is based upon a value
proportional to an association degree representing strength of an association between the drag object and the target object and
inversely proportional to a power of a distance between the drag object and the target object.

15. A computer program product, comprising:
a computer hardware storage device having stored therein program code,
the program code, which when executed by a computer hardware system, causes the computer hardware system to perform:
detecting a target object on the screen, the target object being a destination of the drag object; and
displaying the drag object in a position closer to the target object than a display position of the pointer moved in accordance with the operation user, wherein
the displaying creates an offset amount between the display position of the drag object and the display position of the pointer.

16. The computer program product of claim 15, wherein the program code further causes the computer hardware system to perform:
increasing the offset amount as a distance between the pointer and the target object becomes shorter.

17. The computer program product of claim 15, wherein the program code further causes the computer hardware system to perform:
increasing the offset amount as an association degree representing strength of an association between the drag object and the target object becomes higher.

* * * * *